United States Patent
Lee et al.

(10) Patent No.: US 10,254,792 B2
(45) Date of Patent: Apr. 9, 2019

(54) ELECTRONIC DEVICE INCLUDING ANTENNA

(71) Applicant: Samsung Electronics Co., Ltd., Gyeonggi-do (KR)

(72) Inventors: Won Wook Lee, Gyeonggi-do (KR); June Suk Lee, Seoul (KR)

(73) Assignee: Samsung Electronics Co., Ltd (KR)

(*) Notice: Subject to any disclaimer, the term of this patent is extended or adjusted under 35 U.S.C. 154(b) by 16 days.

(21) Appl. No.: 15/584,436

(22) Filed: May 2, 2017

(65) Prior Publication Data
US 2017/0315584 A1    Nov. 2, 2017

(30) Foreign Application Priority Data

May 2, 2016    (KR) .................. 10-2016-0054115

(51) Int. Cl.
*H01Q 1/27*    (2006.01)
*G06F 1/16*    (2006.01)
(Continued)

(52) U.S. Cl.
CPC ............ *G06F 1/163* (2013.01); *G06F 1/1626* (2013.01); *H01Q 1/273* (2013.01); *H01Q 1/362* (2013.01); *H01Q 1/38* (2013.01)

(58) Field of Classification Search
CPC .......... H01Q 1/27; H01Q 1/273; H01Q 1/362; H01Q 1/38; H01Q 11/08; H01Q 1/242; G06F 1/1626; G06F 1/163
See application file for complete search history.

(56) References Cited

U.S. PATENT DOCUMENTS 4,419,770 A * 12/1983 Yagi .................... G04B 47/025
                                                  368/10
4,817,196 A * 3/1989 MacNak ................. H01Q 1/27
                                                 343/718
(Continued)

FOREIGN PATENT DOCUMENTS

CN         204462670       7/2015
JP          07-29497        6/1995
(Continued)

OTHER PUBLICATIONS

International Search Report dated Aug. 14, 2017 issued in counterpart application No. PCT/KR2017/004613, 10 pages.

*Primary Examiner* — Tho G Phan
(74) *Attorney, Agent, or Firm* — The Farrell Law Firm, P.C.

(57) ABSTRACT

An electronic device is provided which includes an outer housing including a first surface, a second surface, and a side surface, wherein a coupling part is formed at a periphery of the outer housing, a fixing part, a coupling member disposed such that the fixing part is coupled to and supported by the outer housing, a printed circuit board seated inside the outer housing, a processor mounted on the printed circuit board, and a communication module mounted on the printed circuit board and electrically connected with the processor. The coupling member is coupled to one end of the fixing part and to the coupling part, and at least one side of the coupling member is connected with the communication module through a communication signal line such that the coupling member operates as an antenna radiator.

17 Claims, 15 Drawing Sheets

(51) Int. Cl.
*H01Q 1/38* (2006.01)
*H01Q 1/36* (2006.01)

(56) References Cited

U.S. PATENT DOCUMENTS

| | | | |
|---|---|---|---|
| 6,329,903 B1* | 12/2001 | Yamamori | H01Q 1/273 |
| | | | 340/7.63 |
| 7,161,551 B2* | 1/2007 | Sano | G04G 21/04 |
| | | | 343/787 |
| 8,982,000 B2 | 3/2015 | Kim et al. | |
| 9,362,767 B2* | 6/2016 | Sung | H02J 7/0045 |
| 9,912,042 B2* | 3/2018 | Liu | H01Q 1/243 |
| 2011/0012796 A1 | 1/2011 | Kim et al. | |
| 2013/0016016 A1 | 1/2013 | Lin et al. | |
| 2014/0085154 A1 | 3/2014 | Nagahama | |
| 2014/0362544 A1* | 12/2014 | Han | G04G 17/06 |
| | | | 361/749 |
| 2015/0188217 A1 | 7/2015 | Tsai et al. | |

FOREIGN PATENT DOCUMENTS

| | | |
|---|---|---|
| JP | 2014062866 | 4/2014 |
| KR | 0330262 | 10/2003 |
| KR | 1020110006999 | 1/2011 |

\* cited by examiner

ELECTRONIC DEVICE INCLUDING ANTENNA

PRIORITY

This application claims priority under 35 U.S.C. § 119(a) to Korean Patent Application Serial No. 10-2016-0054115, which was filed on May 2, 2016, in the Korean Intellectual Property Office, the entire disclosure of which is incorporated herein by reference.

BACKGROUND

1. Field of the Disclosure

The present disclosure generally relates to an electronic device, and more particularly, to an electronic device including an antenna.

2. Description of the Related Art

An electronic device that is able to be directly mounted on a body of a user or to be fixed to an object is becoming popular. A wearable electronic device may be mounted and used on a portion of the body such as a wrist, an ankle, a neck, a finger, a waist, a shoulder, or a head. Since the user does not need to grip the electronic device directly, an electronic device that is able to be fixed to an object is advantageous in terms of usability. The wearable electronic device is also advantageous in terms of mobility and portability. As an example of the wearable electronic device, a smart watch may have a fixing part (e.g., a strap) to be mounted on a wrist of the user. The fixing part may be detachably coupled to an outer housing of the wearable electronic device.

The electronic device may include an antenna for communication with an external electronic device. In the electronic device, an antenna may be mounted inside the outer housing.

An electronic device that is able to be directly mounted on a user's body or to be fixed to an object may have a small size. In the case where an antenna is mounted inside the outer housing, a space in which other elements are disposed may be insufficiently small.

SUMMARY

Aspects of the present disclosure are to address at least the above-mentioned problems and/or disadvantages and to provide at least the advantages described below.

Accordingly, an aspect of the present disclosure provides an electronic device that uses, as an antenna, a coupling member (e.g., a spring bar) provided such that a fixing part is coupled to, and supported by, an outer housing.

In accordance with an aspect of the present disclosure, an electronic device is provided which includes an outer housing including a first surface facing in a first direction, a second surface facing in a second direction opposite to the first direction, and a side surface surrounding at least a portion of a space between the first surface and the second surface, wherein at least one coupling part is formed at a periphery of the outer housing, a fixing part, at least one coupling member disposed such that the fixing part is coupled to, and supported by, the outer housing, a printed circuit board seated inside the outer housing, a processor mounted on the printed circuit board, and a communication module mounted on the printed circuit board and electrically connected with the processor. The coupling member is coupled to one end of the fixing part and to the at least one coupling part, and at least one side of the coupling member is connected with the communication module through a communication signal line such that the coupling member operates as an antenna radiator.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
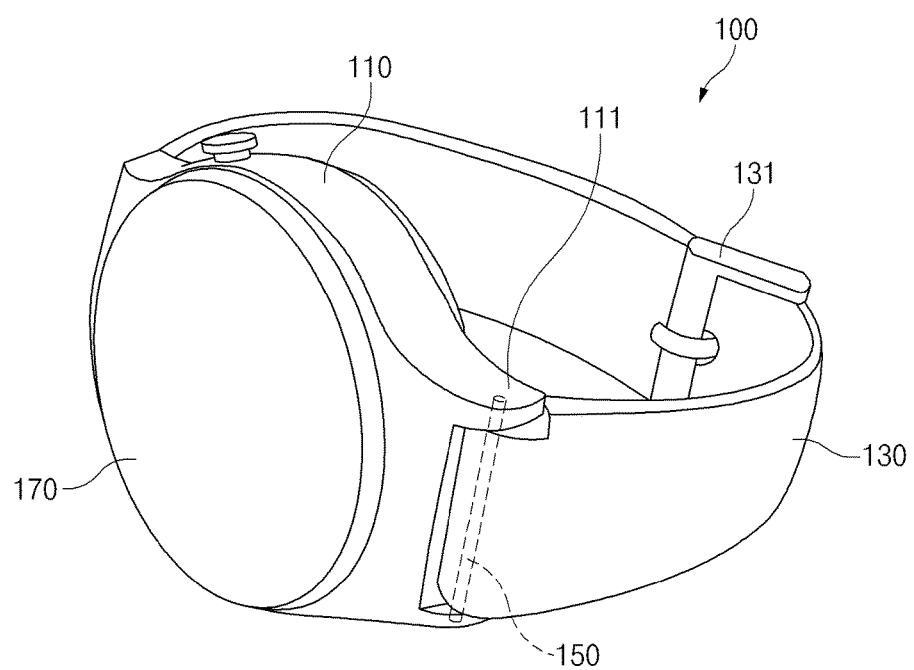
FIG. 1 is a perspective view of an electronic device, according to an embodiment of the present disclosure.

Hereinafter, certain embodiments of the present disclosure are disclosed with reference to the accompanying drawings. However, the present disclosure is not intended to limit the embodiments of the present disclosure to a specific embodiment and it is intended that the present disclosure covers all modifications, equivalents, and/or alternatives of the present disclosure provided they are within the scope of the appended claims and their equivalents. With respect to the descriptions of the accompanying drawings, like reference numerals refer to like elements.

The terms and words used in the following description and claims are not limited to the bibliographical meanings, but are used to enable a clear and consistent understanding of the present disclosure. Accordingly, it should be apparent to those skilled in the art that the following description of certain embodiments of the present disclosure is provided for illustration purpose only and not for the purpose of limiting the present disclosure as defined by the appended claims and their equivalents.

Singular forms "a," "an," and "the" include plural forms unless the context clearly dictates otherwise. Thus, for example, reference to "a component surface" includes reference to one or more such surfaces.

The terms "include," "comprise," and "have", or "may include," or "may comprise" and "may have" as used herein indicate disclosed functions, operations, or existence of elements but does not exclude other functions, operations or elements.

The expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

Terms such as "1st," "2nd," "first," "second," and the like as used herein may refer to modifying different elements of certain embodiments of the present disclosure, but are not intended to limit the elements. For instance, "a first user device" and "a second user device" may indicate different user devices regardless of order or importance. A first component may be referred to as a second component and vice versa without departing from the scope and spirit of the present disclosure.

When a component (for example, a first component) is referred to as being "operatively or communicatively coupled with/to" or "connected to" another component (for example, a second component), the component may be directly connected to the other component or connected through another component (for example, a third component). When a component (for example, a first component) is referred to as being "directly connected to" or "directly accessed by" another component (for example, a second component), another component (for example, a third component) does not exist between the component (for example, the first component) and the other component (for example, the second component).

The expression "configured to" as used in an embodiment of the present disclosure may be interchangeably used with "suitable for", "having the capacity to", "designed to", "adapted to", "made to", or "capable of" according to the situation. The term "configured to" may not necessarily indicate "specifically designed to" in terms of hardware. Instead, the expression "a device configured to" in some situations may indicate that the device and another device or part are "capable of" The expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

The terms used in the present disclosure are used to describe certain embodiments of the present disclosure, but do not limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning In any case, even the terms defined in the present specification are not intended to be interpreted as excluding embodiments of the present disclosure.

An electronic device according to an embodiment of the present disclosure may include a wearable device. The wearable device may include at least one of an accessory-type device (e.g., a watch, a ring, a bracelet, an anklet, a necklace, glasses, a contact lens, a head-mounted device (HMD)), a textile or clothing integrated type device (e.g., an electronic apparel), a body attached type device (e.g., a skin pad or a tattoo), or a bio-implantable type device (e.g., an implantable circuit)

According to an embodiment of the present disclosure, an electronic device may be one or more combinations of the above-mentioned devices. An electronic device may be a flexible device. An electronic device is not limited to the above-mentioned devices, and may include new electronic devices with the development of new technology.

Hereinafter, an electronic device according to an embodiment of the present disclosure will be described in more detail with reference to the accompanying drawings. The term "user" as used herein may refer to a person who uses an electronic device or may refer to a device (e.g., an artificial intelligence electronic device) that uses an electronic device.

FIG. 1 is a perspective view of an electronic device, according to an embodiment of the present disclosure. An electronic device 100 may include a wearable electronic device that is able to be mounted on a portion of a body of a user. The electronic device 100 may be fixed to an object.

Referring to FIG. 1, the electronic device 100 includes an outer housing 110, a coupling member 150, and a fixing part 130. The outer housing 110 may fix and support internal elements of the electronic device 100. A printed circuit board, on which a processor, a memory, a communication module, and the like is mounted, a display, and the like may be seated and fixed inside the outer housing 110. The outer housing 110 may include a front surface, a rear surface, and a side surface surrounding a space between the front surface and the rear surface. A front case 170 may be coupled to a front surface of the outer housing 110. The front case 170 may form a front appearance of the outer housing 110 and may be coupled to the outer housing 110 with a space that allows the internal elements to be received inside the outer housing 110. At least a partial area of the front case 170 may be formed of a transparent material (e.g., glass), and a screen output through the display may be displayed to the outside through the transparent area of the front case 170. At least a partial area of the front case 170 may be formed of a metal material. In this case, the outer housing 110 may be used as an antenna.

According to an embodiment of the present disclosure, the outer housing 110 may have substantially a cylindrical shape, but is not limited thereto. The outer housing 110 may be provided in a cuboid shape. At least one coupling part 111 may be provided at a periphery of the outer housing 110. In the case where the outer housing 110 has a cylindrical shape, a first coupling part may extend from an outer peripheral surface of the outer housing 110 in a first direction by a specific length with respect to a central point of the outer housing 110, and a second coupling part may extend from the outer peripheral surface of the outer housing 110 in a second direction that is opposite to the first direction by a specific length with respect to the central point of the outer housing 110. Alternatively, when the outer housing 110 is provided with a cuboid, the first coupling part may extend from one side surface of the outer housing 110 by a specific length, and the second coupling part may extend from a side surface that is opposite to the one side surface of the outer housing 110 by a specific length. In addition, each of the first coupling part and the second coupling part may include a pair of pillars that are spaced apart from each other by a specific distance to face each other, on opposite sides thereof. The first coupling part may include a pair of a first pillar and a second pillar that are spaced apart from each other to face each other, on opposite sides thereof. The second coupling part may include a pair of a third pillar and a fourth pillar that are spaced apart from each other to face each other, on opposite sides thereof.

The coupling part 111 may be provided such that the coupling member 150 may be detached from, and attached to, the coupling part 111. In an embodiment of the present disclosure, a coupling recess may be provided in a specific area of the coupling part 111, and the coupling member 150 may be inserted into and coupled to the coupling recess. In the first coupling part, a first coupling recess and a second coupling recess may be respectively provided in the first pillar and the second pillar provided on opposite sides of the first coupling part. In this case, the first coupling recess and the second coupling recess may be respectively provided on surfaces that the first pillar and the second pillar face. Likewise, in the second coupling part, a third coupling recess and a fourth coupling recess may be respectively provided in the third pillar and the fourth pillar provided on opposite sides of the second coupling part.

The fixing part 130 may be mounted on a portion (e.g., a wrist) of the user body or fixed to an object. The fixing part 130 may have a length (e.g., a length relatively larger than a circumference of a wrist) of a specified size or larger, such that the electronic device 100 is mounted on a portion of the user body. In an embodiment of the present disclosure, the fixing part 130 may have a strap shape of which a length and a width are not less than a specified size. However, a shape of the fixing part 130 is not limited thereto. Any shape of the fixing part 130 that allows the electronic device 100 to be mounted on a portion of the user body or to be fixed to an object may be included in the scope and spirit of the present disclosure.

The fixing part 130 may be coupled to the coupling part 111 of the outer housing 110. For example, opposite ends of the fixing part 130 may be respectively coupled to the first coupling part and the second coupling part provided at opposite ends of the outer housing 110. The opposite ends of the fixing part 130 may be fitted between the pillars provided on opposite sides of the first coupling part and the second coupling part and may be coupled with the pillars through the coupling member 150.

The fixing part 130 may be divided into a plurality of fixing parts so as to be coupled to different peripheries of the outer housing 110, respectively. A first fixing part may be coupled to the first coupling part of the outer housing 110, and the second fixing part may be coupled to the second coupling part of the outer housing 110. In this case, in the fixing part 130, a coupling part 131 may be provided at a periphery opposite to a periphery coupled to the outer housing 110. The coupling part 131 may connect and fix the first fixing part and the second fixing part. The coupling part 131 may include a hook and a stopper that are respectively provided at peripheries of the first fixing part and the second fixing part, and the hook and the stopper may be hook-coupled to physically connect the first fixing part and the second coupling part. Alternatively, the coupling part 131 may include magnetic materials provided at the peripheries of the first fixing part and the second fixing part such that the first fixing part and the second coupling part are magnetically connected to each other. In the case where the fixing part 130 is provided in an integral (or single) shape, the fixing part 130 may be a buckle of which a wearing or fixing length is adjustable according to a circumference of a portion of the user body on which the fixing part 130 is mounted or according to a circumference of an object to which the fixing part 130 is fixed.

The coupling member 150 may be provided such that the fixing part 130 is coupled to and supported by the outer housing 110. The coupling member 150 may be coupled to each of opposite ends of the fixing part 130 and may be coupled to the coupling part 111. A first coupling member may be coupled to a periphery of the first fixing part and may be coupled to the first pillar and the second pillar provided on the opposite side of the first coupling part. A second coupling member may be coupled to a periphery of the second fixing part and may be coupled to the third pillar and the fourth pillar provided on the opposite side of the second coupling part.

The coupling member 150 may have a bar shape. The coupling member 150 may have a cylindrical shape of which the base side is substantially circular or a square pillar shape of which the base side is square. The coupling member 150 is illustrated in FIG. 1 as being cylindrical. The coupling member 150 may have a length of a specified size or larger. A length of the coupling part 150 may be relatively larger than a width of each of the opposite ends of the fixing part 130. As such, in the case where the coupling member 150 is inserted into openings provided at opposite ends of the fixing part 130 and is coupled with the fixing part 130, opposite ends of the coupling member 150 may protrude outwards. In this case, the opposite ends of the coupling member 150 protruding to the outside may be inserted into the coupling recesses provided in the coupling part 111.

The coupling member 150 may be detachably coupled to the outer housing 110. The coupling member 150 may include an elastic member (e.g., a spring) having elasticity of a specified size. As the elastic member is elastically deformed in a lengthwise direction of the coupling member 150, the coupling member 150 may be fitted between the pillars provided on the opposite sides of the coupling part 111. At least a portion of the coupling member 150 may be formed of an elastic material having elasticity of a specified size. In this case, as the portion of the coupling member 150 formed of an elastic material is bent or is elastically deformed in a lengthwise direction of the coupling member 150, the coupling member 150 may be fitted between the pillars provided on the opposite sides of the coupling part 111.

The coupling member 150 may be used as an antenna radiator. In an embodiment of the present disclosure, a spring included in the coupling member 150 may be used as an antenna radiator. The spring of a helical shape may be used as a helical antenna. In this case, at least one of opposite ends of the spring may be electrically connected with a feeding part provided inside the outer housing 110. A conductive member may be provided inside the coupling member 150 or may be coupled to an outer surface of the coupling member 150, and thus, the conductive member may be used as an antenna radiator. In this case, a length of the coupling member 150 may be difficult to exceed a specified size due to a characteristic of a device that is fixed to an object or is mounted on a portion of a user body. For this reason, the conductive member may have the helical shape. The conductive member may be provided inside the coupling member 150 like a spring in a helical shape or may be wound on an outer peripheral surface of the coupling member 150 in a helical shape.

Figure 2A:
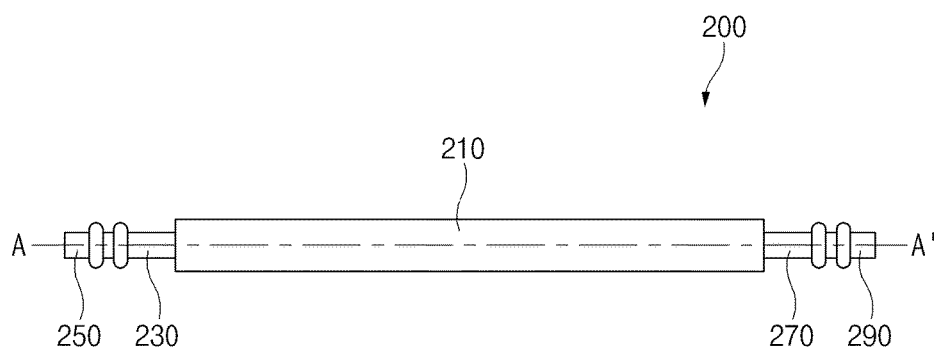
FIG. 2A is a plan view of a coupling member according to an embodiment of the present disclosure.

FIG. 2A is a plan view of a coupling member, according to an embodiment of the present disclosure.

Figure 2B:
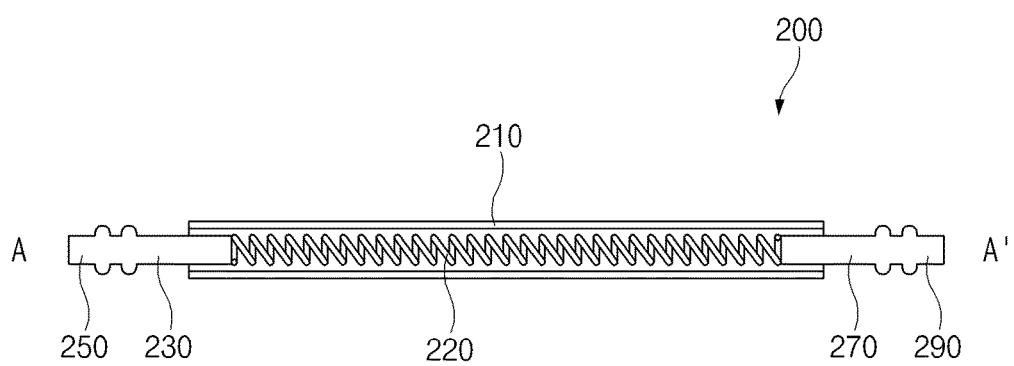
FIG. 2B is a cross sectional view taken along a line A-A' of a coupling member of FIG. 2A, according to an embodiment of the present disclosure.

FIG. 2B is a cross sectional view taken along a line A-A' of a coupling member of FIG. 2A according to an embodiment of the present disclosure.

Referring to FIGS. 2A and 2B, the coupling member 200 includes a central portion 210, an elastic member 220, a first extension 230, a first periphery 250, a second extension 270, and a second periphery 290. The central portion 210 may have a cylindrical shape of which a length is not less than a specified size. In an embodiment of the present disclosure, a hollow may be formed inside the central portion 210. The central portion 210 may be provided in the form of a tube in which a hollow is formed. The central portion 210 may be formed of a conductive material to be used as an antenna radiator or a ground area. Alternatively, the central portion 210 may be formed of a non-conductive material.

The elastic member 220 may be placed in the hollow formed inside the central portion 210. The elastic member 220 may allow the coupling member 200 to be elastically deformed in a lengthwise direction thereof. In an embodiment of the present disclosure, the coupling member 220 may have a helical shape and may be used as an antenna radiator.

The first extension 230 may be coupled with a left periphery of the elastic member 220. A portion of the first extension 230 may be provided in the form of a cylinder having a diameter that is the same as or similar to a diameter of the hollow formed in the central portion 210. In this case, the portion of the first extension 230 having the cylindrical shape may be inserted into the inside of the central portion 210 to support the elastic member such that the elastic member is not exposed to the outside of the central portion 210. The first extension 230 may be formed such that a portion of a side surface of the first extension 230 protrudes outwards. In this case, the elastic member 220 may be held by a protrusion of the first extension 230 when elastically deformed in a lengthwise direction of the coupling member 200 from the inside of the central portion 210, thereby making it possible to restrict an elastic length.

The first periphery 250 may be coupled to an outer housing 110 of the electronic device 100. The first periphery 250 may extend from the left periphery of the first extension 230 by a specific length. According to an embodiment of the present disclosure, a portion of the first periphery 250 may protrude outwards.

The second extension 270 may be coupled with a right periphery of the elastic member 220. Like the first extension 230, the second extension 270 may be provided in the form of a cylinder having a diameter that is the same as or similar to a diameter of the hollow formed in the central portion 210, and a portion of a side surface of the second extension 270 may protrude outwards.

Like the first periphery 250, the second periphery 290 may be coupled to the outer housing of the electronic device. The second periphery 290 may extend from the right periphery of the second extension 270 by a specific length. A portion of the second periphery 290 may protrude outwards.

Figure 3:
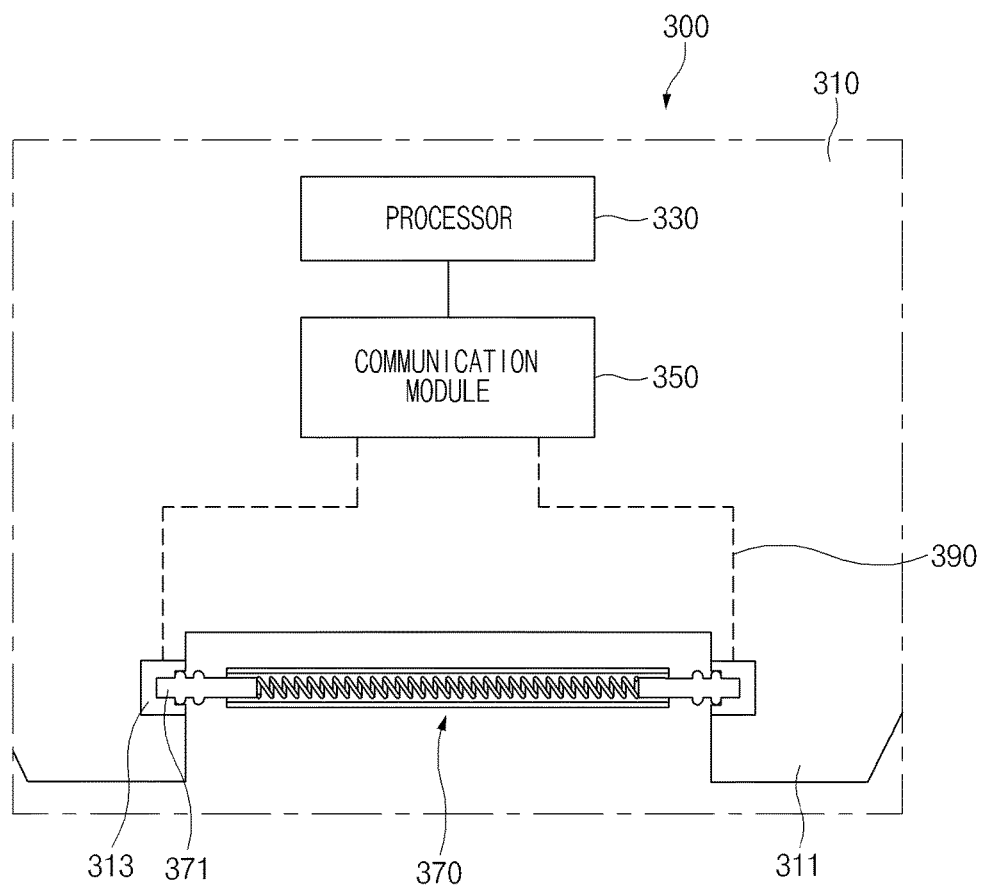
FIG. 3 illustrates a connection between elements of an electronic device and a coupling member, according to an embodiment of the present disclosure.

FIG. 3 illustrates a connection between elements of an electronic device and a coupling member, according to an embodiment of the present disclosure.

Referring to FIG. 3, an electronic device 300 includes an outer housing 310, a processor 330, a communication module 350, and a coupling member 370. A fixing part 310 is illustrated in FIG. 3 as being not coupled to the outer housing 310 in order to describe a shape in which the coupling member 370 is coupled to the outer housing 310.

The processor 330 may include one or more of a central processing unit (CPU), an application processor (AP), or a communication processor (CP). The processor 330 may perform, for example, data processing or an operation associated with control or communication of at least one other element(s) of the electronic device 300.

The communication module 350 may establish communication between the electronic device 300 and an external device (e.g., an electronic device paired with the electronic device 300). The communication module 350 may be connected to a network through wireless communication or wired communication, thus communicating with the external device. The communication module 350 may be electrically connected with the coupling member 370 through a communication signal line 390. The communication signal line 390 is a feeding line of an antenna radiator (e.g., the elastic member 220) provided in the coupling member 370 and may be connected to at least one periphery 371 of the coupling member 370.

The opposite peripheries 371 of the coupling member 370 may be coupled to a coupling part 311 of the outer housing 310. The coupling part 311 may extend from a periphery of the outer housing 310 by a specific length and may include a pair of pillars that face each other, on opposite sides thereof. A coupling recess 313 may be provided on each of side surfaces of a direction in which the pillars face each other, and the opposite peripheries 371 of the coupling member 370 may be respectively inserted into the coupling recesses 313. In a process in which the opposite peripheries 371 are inserted into the coupling recesses 313, the elastic member 370 may be elastically deformed in a lengthwise direction of the coupling member 370. The opposite peripheries 371 may be fitted between the pillars while the coupling member 370 is pressed and may be then be inserted into the coupling recesses 313 while being aligned to the coupling recesses 313. As the length of the coupling member 370 is restored by elasticity, the opposite peripheries 371 may be fixed in the coupling recesses 313.

Figure 4A:
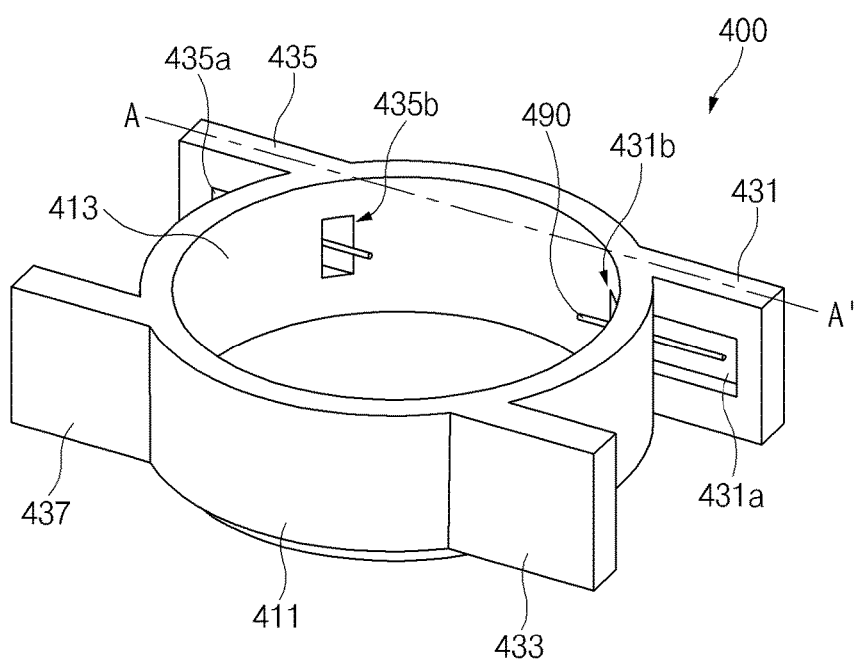
FIG. 4A is a perspective view of an outer housing of a first shape, according to an embodiment of the present disclosure.

FIG. 4A is a perspective view of an outer housing of a first shape, according to an embodiment of the present disclosure.

Figure 4B:
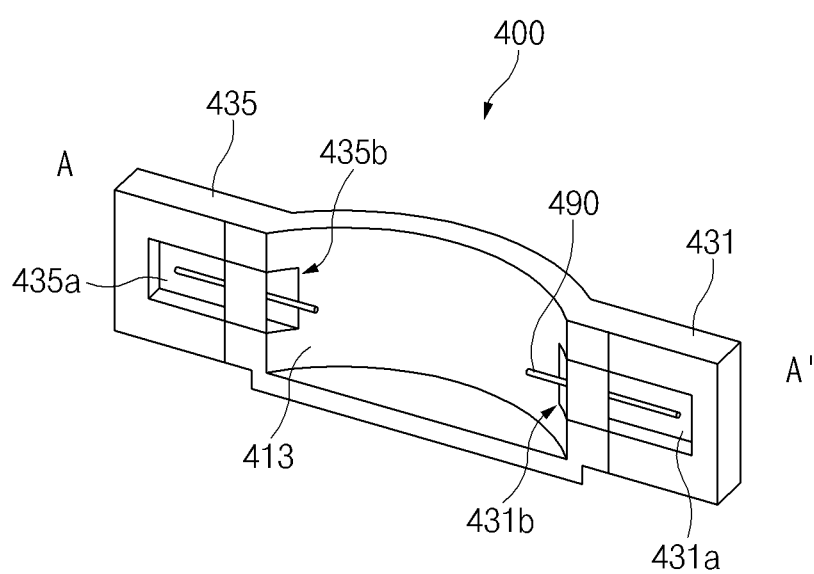
FIG. 4B is a sectional view taken along a line A-A' of an outer housing of FIG. 4A, according to an embodiment of the present disclosure.

FIG. 4B is a sectional view taken along a line A-A' of an outer housing of FIG. 4A, according to an embodiment of the present disclosure.

Referring to FIGS. 4A and 4B, an outer housing 400 may have substantially a cylindrical shape. At least one coupling part may be provided at a periphery of the outer housing 400. An embodiment of the present disclosure is exemplified in FIGS. 4A and 4B as two coupling parts provided in the outer housing 400. A first coupling part may extend from an outer peripheral surface 411 of the outer housing 400 in a first direction by a specific length with respect to a central point of the outer housing 400, and a second coupling part may extend from the outer peripheral surface 411 of the outer housing 400 in a second direction that is opposite to the first direction by a specific length with respect to the central point of the outer housing 400.

Each of the first coupling part and the second coupling part may include a pair of pillars that are spaced apart from each other by a specific distance to face each other, on opposite sides thereof. The first coupling part may include a pair of a first pillar and a second pillar that are spaced apart from each other to face each other, on opposite sides thereof.

The second coupling part may include a pair of a third pillar and a fourth pillar that are spaced apart from each other to face each other, on opposite sides thereof. A spacing distance between the first pillar 431 and the second pillar 433 may be the same as or similar to a spacing distance between the third pillar 435 and the fourth pillar 437.

The pillars may have coupling recesses provided on side surfaces of the pillars which face each other. The first pillar 431 and the second pillar 433 may respectively have a first coupling recess 431a and a second coupling recess provided on side surfaces thereof, which face each other. The third pillar 435 and the fourth pillar 437 may respectively have a third coupling recess 435a and a fourth coupling recess provided on side surfaces thereof, which face each other.

Each coupling recess may be formed by recessing a portion of a side surface of each pillar. As illustrated in FIGS. 4A and 4B, each coupling recess may be formed by recessing a portion of a side surface of each pillar with a specified length, width, and depth. Communication signal lines 490 may be disposed in the coupling recesses. For example, each of the coupling recesses may extend from a portion of a side surface of each pillar to a portion of an inner peripheral surface 413 of the outer housing 400. In this case, through holes that pass through the outer peripheral surface 411 and the inner peripheral surface 413 of the outer housing 400 may be formed, and the communication signal lines 490 may be inserted into and disposed in the through holes. An embodiment of the present disclosure is illustrated in FIGS. 4A and 4B in which a first through hole 431b is formed as the first coupling recess 431a extends from a portion of a side surface of the first pillar 431 to a portion of the inner peripheral surface 413 of the outer housing 400 and in which a third through hole 435b is formed as the third coupling recess 435a extends from a portion of a side surface of the third pillar 435 to a portion of the inner peripheral surface 413 of the outer housing 400. A second through hole may be formed as the second coupling recess extends from a portion of a side surface of the second pillar to a portion of the inner peripheral surface 413 of the outer housing 400, and a fourth through hole may be formed as the fourth coupling recess extends from a portion of a side surface of the fourth pillar to a portion of the inner peripheral surface 413 of the outer housing 400.

The coupling recesses may be filled with a dielectric material for strength and signal characteristics. The communication signal lines 490 may be implemented with a conducting wire, a coaxial wire, a flexible printed circuit board, and the like.

Figure 5A:
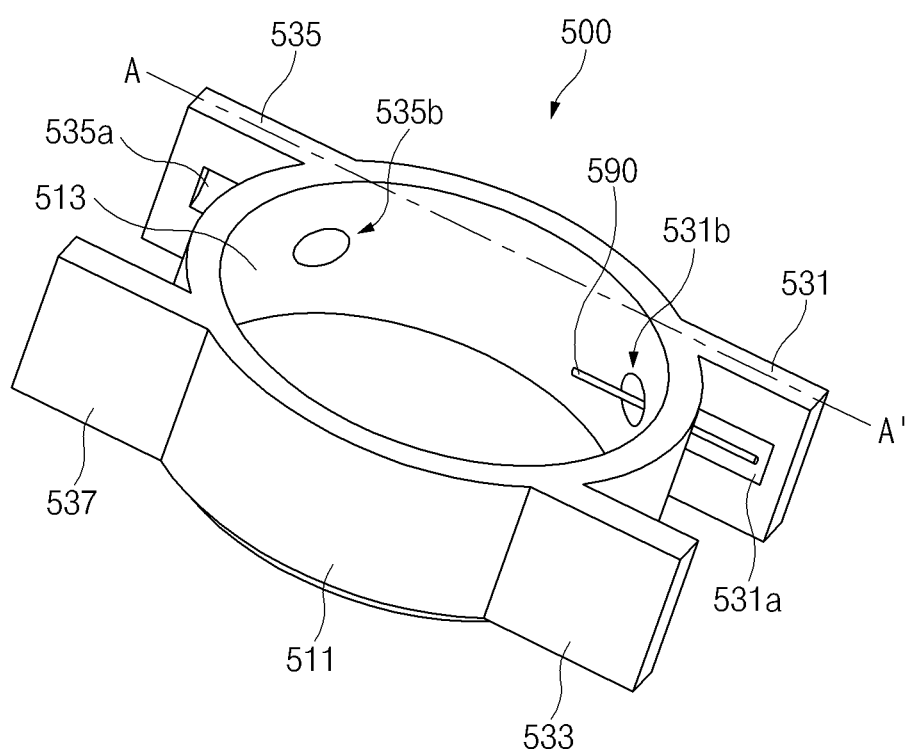
FIG. 5A is a perspective view of an outer housing of a second shape, according to an embodiment of the present disclosure.

FIG. 5A is a perspective view of an outer housing of a second shape, according to an embodiment of the present disclosure.

Figure 5B:
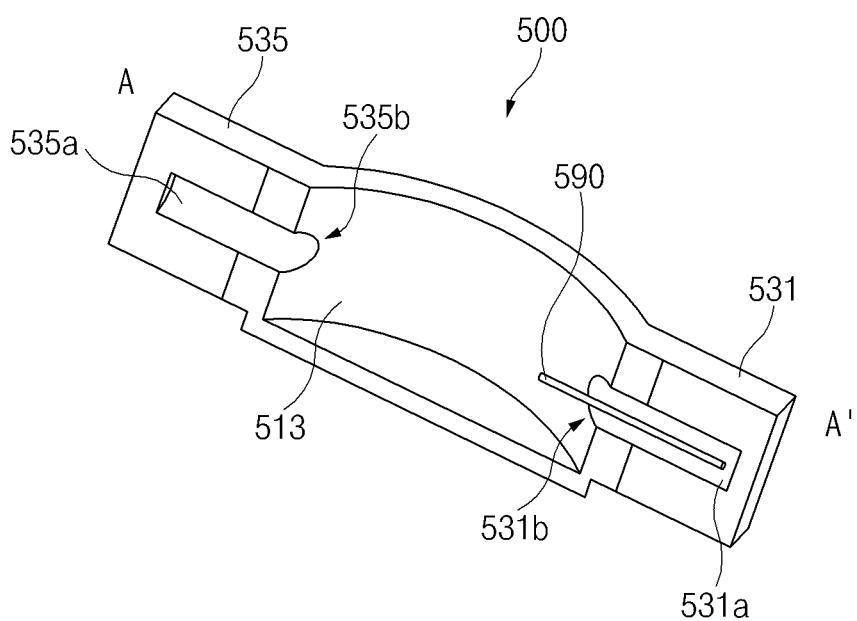
FIG. 5B is a sectional view taken along a line A-A' of an outer housing FIG. 5A, according to an embodiment of the present disclosure.

FIG. 5B is a sectional view taken along a line A-A' of an outer housing FIG. 5A, according to an embodiment of the present disclosure.

Referring to FIGS. 5A and 5B, the outer housing 500 includes a first coupling part that extends from an outer peripheral surface 511 of the outer housing 500 in a first direction by a specific length with respect to a central point of the outer housing 500 and a second coupling part that extends from the outer peripheral surface 511 of the outer housing 500 in a second direction that is opposite to the first direction by a specific length with respect to the central point of the outer housing 500.

Each of the first coupling part and the second coupling part may include a pair of pillars that are spaced apart from each other by a specific distance to face each other, on opposite sides thereof. The first coupling part includes a first pillar 531 and a second pillar 533, and the second coupling part includes a third pillar 535 and a fourth pillar 537.

The pillars may have coupling recesses provided on side surfaces in which the pillars face each other. The first pillar 531 and the second pillar 533 may have a first coupling recess 531a and a second coupling recess provided on side surfaces that face each other, and the third pillar 535 and the fourth pillar 537 may have a third coupling recess 535a and a fourth coupling recess provided on side surfaces that face each other.

Each of the coupling recesses may extend from a portion of a side surface of each pillar to a portion of an inner peripheral surface 513 of the outer housing 500 in a curved shape. In this case, through holes that pass through an outer peripheral surface 511 and the inner peripheral surface 513 of the outer housing 500 may be formed in a circular shape. An embodiment of the present disclosure is illustrated in FIGS. 5A and 5B in which a first through hole 531b is formed as the first coupling recess 531a extends from a portion of a side surface of the first pillar 531 to a portion of the inner peripheral surface 513 of the outer housing 500 in a curved shape and in which a third through hole 535b is formed as the third coupling recess 535a extends from a portion of a side surface of the third pillar 535 to a portion of the inner peripheral surface 513 of the outer housing 500 in a curved shape. A second through hole may be formed as the second coupling recess extends from a portion of a side surface of the second pillar 533 to a portion of the inner peripheral surface 513 of the outer housing 500 in a circular shape, and a fourth through hole may be formed as the fourth coupling recess extends from a portion of a side surface of the fourth pillar 537 to a portion of the inner peripheral surface 513 of the outer housing 500 in a circular shape.

As described above, if a communication signal line 590 is inserted into the through hole formed in a circular shape and a dielectric material is filled in the coupling recesses formed in a curved shape, it may be possible to supply power or signals in the same or similar manner as a coaxial wire, thereby having an advantage in electrical signal characteristics.

Figure 6:
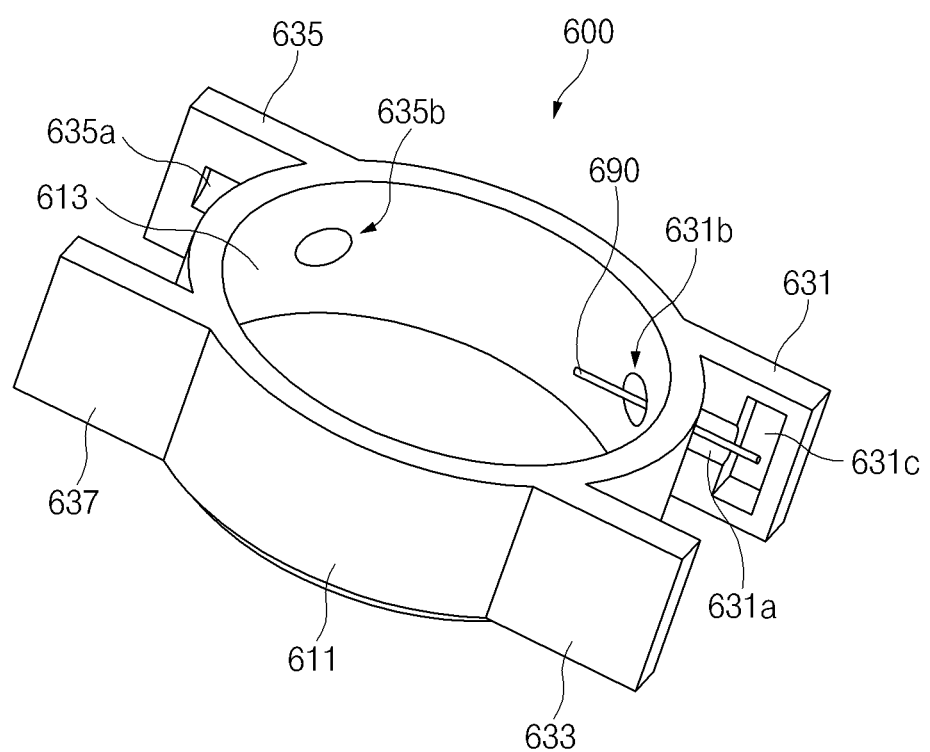
FIG. 6 is a perspective view of an electronic device of a third shape, according to an embodiment of the present disclosure.

FIG. 6 is a perspective view of an electronic device of a third shape, according to an embodiment of the present disclosure.

Referring to FIG. 6, the outer housing 600 may include a first coupling part that extends from an outer peripheral surface 611 of the outer housing 600 in a first direction by a specific length with respect to a central point of the outer housing 600 and a second coupling part that extends from the outer peripheral surface 611 of the outer housing 600 in a second direction that is opposite to the first direction by a specific length with respect to the central point of the outer housing 600.

Each of the first coupling part and the second coupling part may include a pair of pillars that are spaced apart from each other by a specific distance to face each other, on opposite sides thereof. The first coupling part may include a first pillar 631 and a second pillar 633, and the second coupling part may include a third pillar 635 and a fourth pillar 637.

The pillars may have coupling recesses provided on side surfaces in which the pillars face each other. The first pillar 631 and the second pillar 633 may have a first coupling recess 631a and a second coupling recess provided on side surfaces that face each other, and the third pillar 635 and the fourth pillar 637 may have a third coupling recess 635a and a fourth coupling recess provided on side surfaces that face each other.

Each of the coupling recesses may extend from a portion of a side surface of each pillar to a portion of an inner peripheral surface 613 of the outer housing 600. An embodiment of the present disclosure is illustrated in FIG. 6 in which a first through hole 631b is formed as the first coupling recess 631a extends from a portion of a side surface of the first pillar 631 to a portion of the inner peripheral surface 613 of the outer housing 600 and in which a third through hole 635b is formed as the third coupling recess 635a extends from a portion of a side surface of the third pillar 635 to a portion of the inner peripheral surface 613 of the outer housing 600. A second through hole may be formed as the second coupling recess extends from a portion of a side surface of the second pillar 633 to a portion of the inner peripheral surface 613 of the outer housing 600, and a fourth through hole may be formed as the fourth coupling recess extends from a portion of a side surface of the fourth pillar 637 to a portion of the inner peripheral surface 613 of the outer housing 600.

The coupling member 200 may contact a communication signal line 690 disposed in at least one coupling recess upon being coupled in the coupling recesses. Since radiation energy is concentrated in a contact area of the coupling member and the communication signal line 690, loss of radiation may occur in the case where the communication signal line 690 is coupled with a peripheral conductive member (e.g., a metal). To prevent the loss of radiation due to coupling, recessed portions may be formed in the pillars to be adjacent to the contact area of the coupling member and the communication signal line 690. The recessed portions may be formed to be deeper and wider than the coupling recesses. An embodiment of the present disclosure is illustrated in FIG. 6 as a first recessed portion 631c is formed to be deeper and wider than the first coupling recess 631a. As such, the distance between the contact area and the peripheral conductive member may increase, thereby improving radiation performance of an antenna.

Figure 7A:
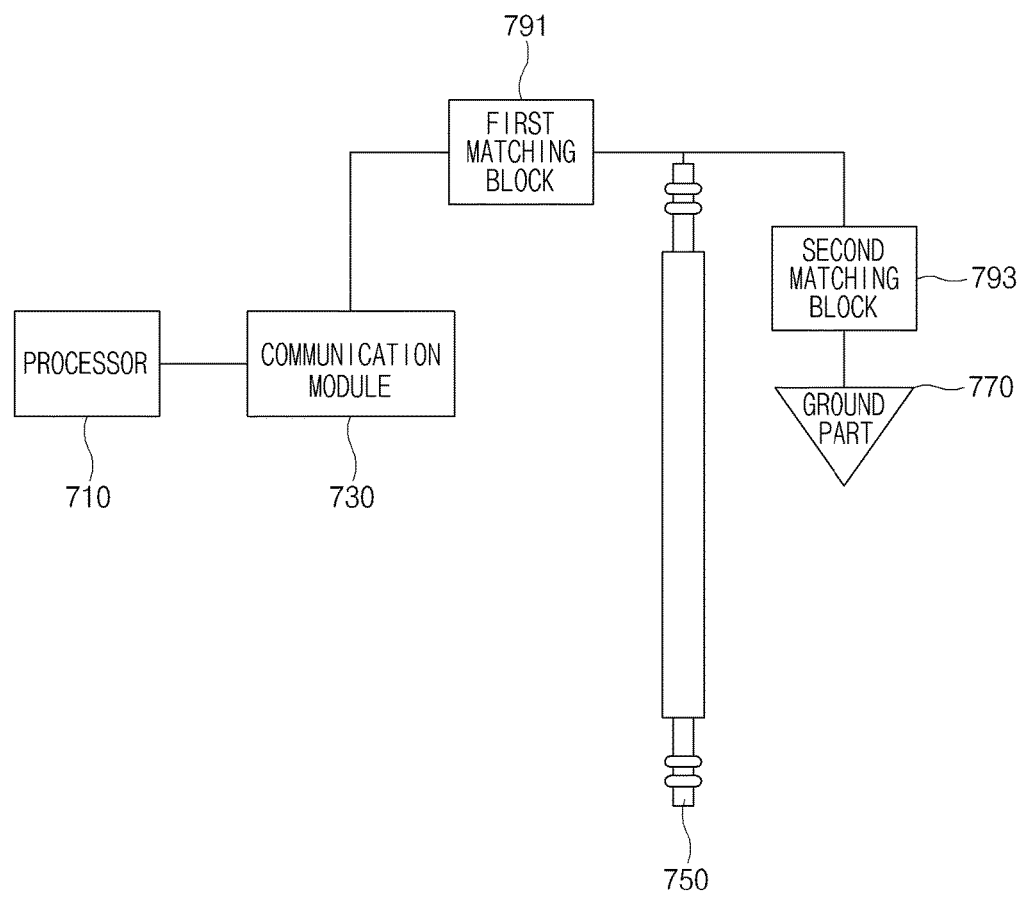
FIG. 7A illustrates a first configuration of an antenna using a coupling member, according to an embodiment of the present disclosure.

FIG. 7A illustrates a first configuration of an antenna using a coupling member according to an embodiment of the present disclosure.

Figure 7B:
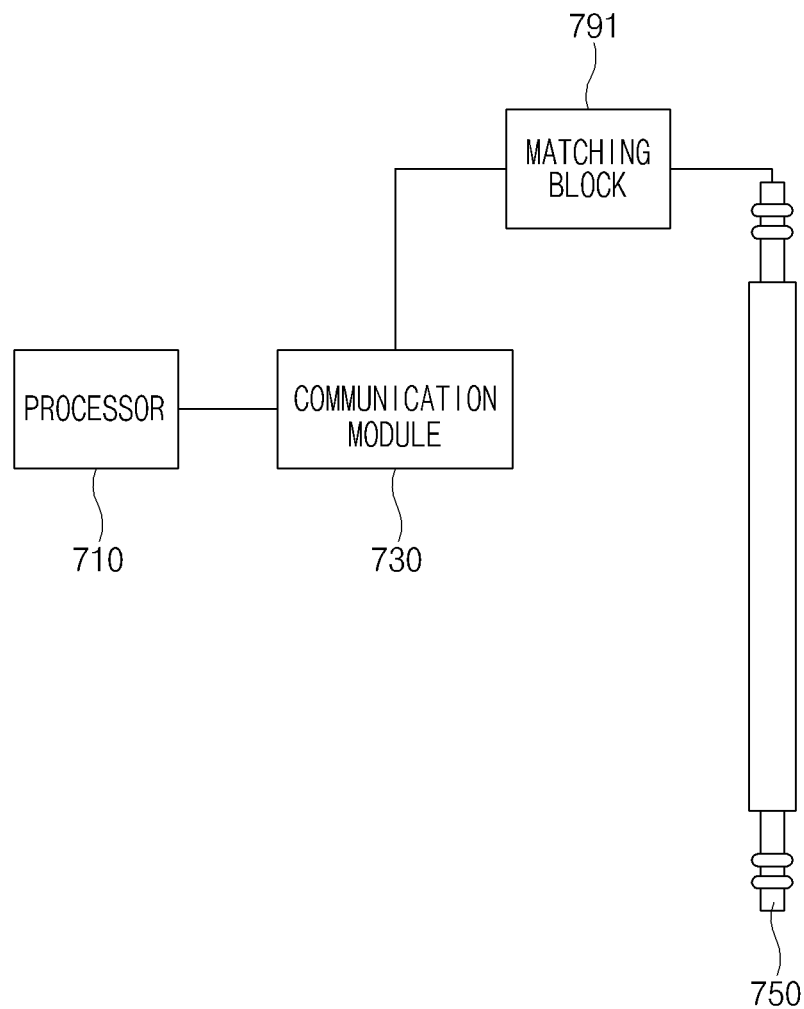
FIG. 7B illustrates a second configuration of an antenna using a coupling member, according to an embodiment of the present disclosure.

FIG. 7B illustrates a second configuration of an antenna using a coupling member according to an embodiment of the present disclosure.

Referring to FIGS. 7A and 7B, the electronic device 100 may use a coupling member 750 as a radiator of an antenna. In an embodiment of the present disclosure, the electronic device may use the elastic member 220 included in the coupling member 750 as the antenna radiator. The coupling member 750 may be connected with a communication module 730, which is electrically connected with a processor 710, and a ground part 770. A first matching block 791 and a second matching block 793 may be respectively disposed between the communication module 730 and the coupling member 750 and between the ground part 770 and the coupling member 750. As an electrical circuit having impedance of a specific value, each of the first matching block 791 and the second matching block 793 may be a matching circuit (or a filter circuit) that selectively blocks or passes a signal of a specific frequency band. Each of the first matching block 791 and the second matching block 793 may be composed of at least one inductor and at least one capacitor. In this case, the first matching block 791 and the second matching block 793 may perform a function of selecting a specific frequency determined according to values of the inductor and the capacitor by using an electrical resonant phenomenon at the specific frequency.

An antenna configuration of FIG. 7A indicates a shape of a planar inverted F antenna (PIFA), and an antenna configuration of FIG. 7B indicates a shape of a monopole antenna. In an embodiment of the present disclosure, the ground part 770 may be provided in the outer housing 110 or may be provided in a printed circuit board placed in the outer housing. A feeding part may be connected to one side of the coupling member 750, and a ground part may be connected to an opposite side of the coupling member 750.

Figure 8A:
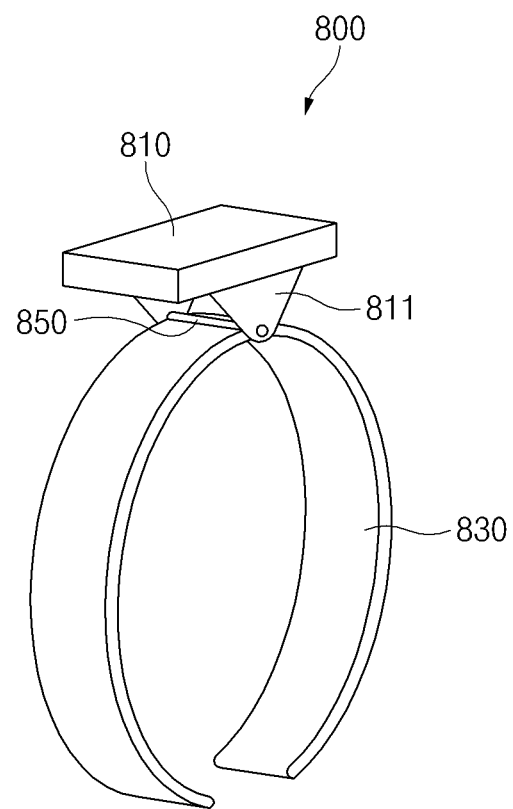
FIG. 8A is a perspective view of an electronic device of a ring shape, according to an embodiment of the present disclosure.

FIG. 8A is a perspective view of an electronic device of a ring shape, according to an embodiment of the present disclosure.

Figure 8B:
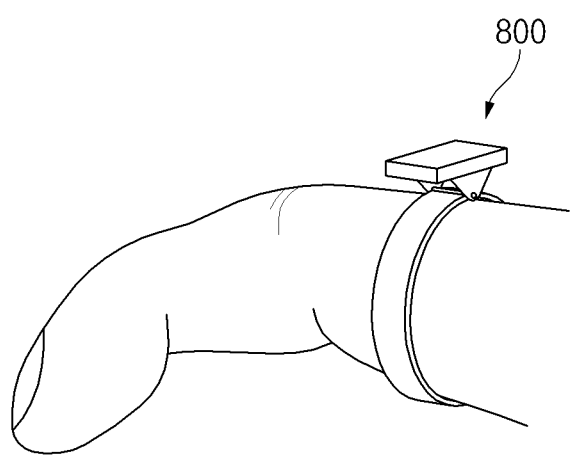
FIG. 8B is a view illustrating a state in which an electronic device of FIG. 8A is worn by a user.

FIG. 8B is a view illustrating a state in which an electronic device of FIG. 8A is worn by a user, according to an embodiment of the present disclosure.

Referring to FIGS. 8A and 8B, an electronic device 800 may have a ring shape. A fixing part 830 may be provided to be placed on a finger of a user.

The electronic device 800 includes an outer housing 810, a coupling part 811 extending from one side of the outer housing 810, and the fixing part 830 coupled to the coupling part 811. As illustrated in FIGS. 8A and 8B, the coupling part 811 may include a pair of pillars that extend from a lower surface of the outer housing 810 and are spaced apart from each other to face each other, on opposite sides of the outer housing 810.

The fixing part 830 may be coupled with the coupling member 850, and the coupling member 850 may be coupled to the pillars. As illustrated in FIGS. 8A and 8B, the coupling member 850 may be coupled to a front surface of the fixing part 830, and the coupling member 850 may be inserted into and coupled to coupling recesses provided in the pillars. Since the coupling member 850 needs to be spaced apart from a body of a user to use the coupling member 850 as an antenna, it may be preferable to couple the coupling member 850 to the front surface of the fixing part 830 rather than a rear surface of the fixing part 830 contacting the user body.

When the electronic device 800 has a ring shape, a size of the electronic device 800 may be restrict the electronic device 800 from mounting on a finger of the user. The fixing part 830 may have a length and a width of a specified size or larger. The coupling member 850 may have a length and a diameter of a specified size or smaller. When the length and width of the coupling member 850 are not more than a specified size, an electrical length may be insufficient to use the coupling member 850 as an antenna. In this case, the electronic device 800 may use the coupling member and the outer housing 810 connected with the coupling member 850 as an antenna.

Figure 9A:
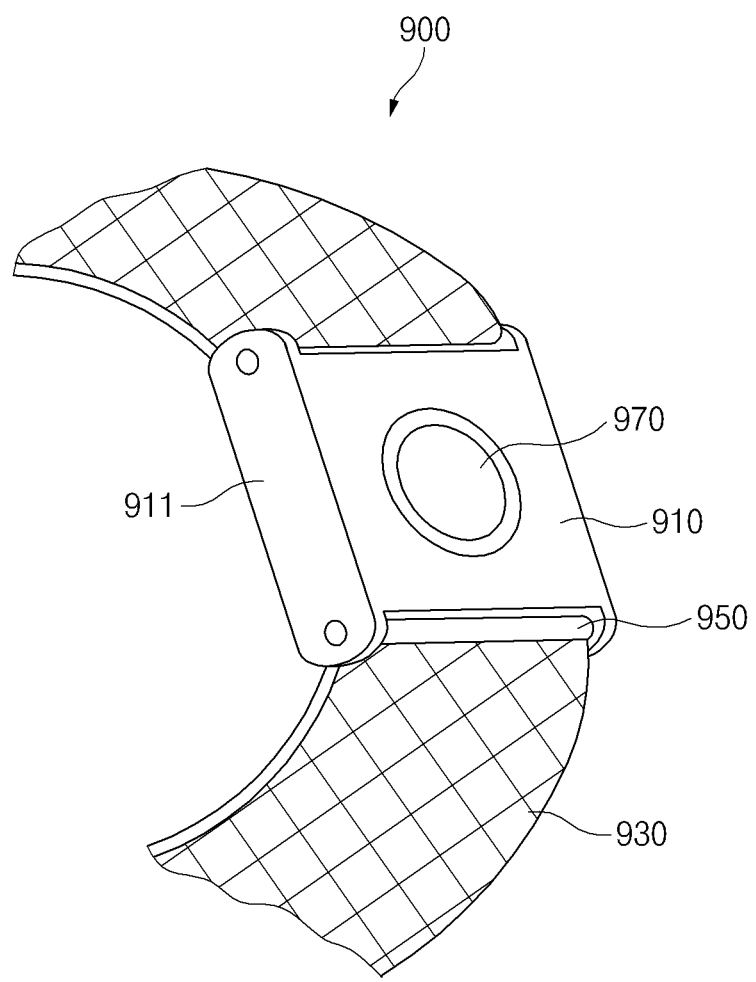
FIG. 9A is a perspective view of an electronic device including a camera, according to an embodiment of the present disclosure.

FIG. 9A is a perspective view of an electronic device including a camera, according to an embodiment of the present disclosure.

Figure 9B:
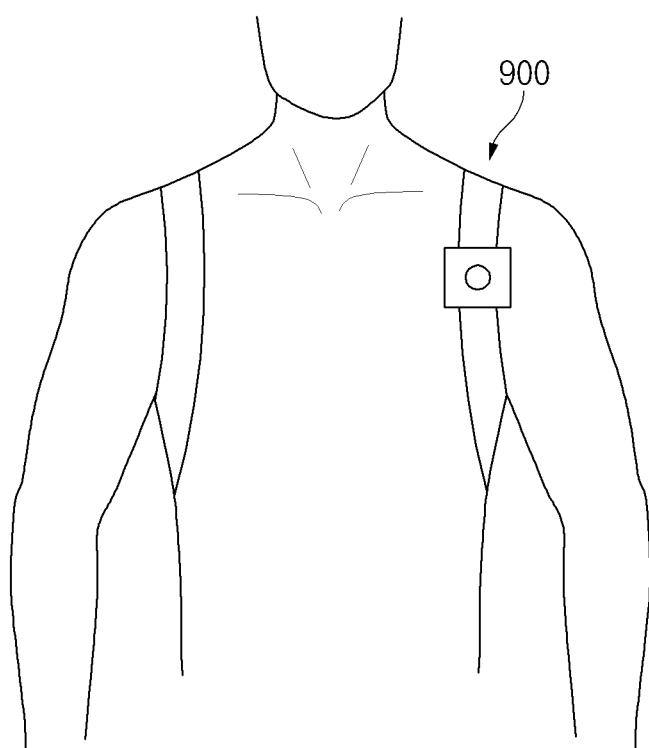
FIG. 9B is a view illustrating a state in which an electronic device of FIG. 9A is worn by a user.

FIG. 9B is a view illustrating a state in which an electronic device of FIG. 9A is worn by a user, according to an embodiment of the present disclosure.

Referring to FIGS. 9A and 9B, an electronic device 900 includes a camera module 970. According to an embodiment of the present disclosure, in the electronic device 900, the camera module 970 may be seated in an outer housing 910, and the camera module 970 may be exposed to the outside through one surface of the outer housing 910. The electronic device 900 may be an action cam that is mountable on a portion of a body of a user. An embodiment of the present disclosure is illustrated in FIG. 9B as the electronic device 900 is mounted on a shoulder of the user.

A coupling part 911 may be provided in a peripheral area of the outer housing 910, and a coupling member 950 to which a fixing part 930 is coupled may be coupled to the coupling part 911. As illustrated in FIG. 9A, the coupling part 911 may form a side surface of the outer housing 910. A pair of coupling parts 911 may be provided on a left side surface and a right side surface of the outer housing 910 to face each other and be parallel with each other.

According to an embodiment of the present disclosure, the electronic device 100 may include an outer housing 110 including a first surface facing in a first direction, a second surface facing in a second direction opposite to the first direction, and a side surface surrounding at least a portion of a space defined between the first surface and the second surface, wherein the coupling part 111 is formed at a periphery of the outer housing, the fixing part 130 configured to fix an object, the coupling member 150 provided such that the fixing part is coupled to and supported by the outer housing, a printed circuit board seated inside the outer housing, a processor 330 mounted on the printed circuit board, and a communication module 350 mounted on the printed circuit board and electrically connected with the processor. The coupling member may be coupled to one end of the fixing part and to the coupling part, and at least one side of the coupling member is connected with the communication module through a communication signal line 390 such that the coupling member operates as an antenna.

The outer housing may have substantially a cylindrical shape. The at least one coupling part may include a first coupling part and a second coupling part. The first coupling part may extend from a partial portion of an outer peripheral surface of the outer housing by a specific length in a third direction that is substantially perpendicular to the first direction or the second direction with respect to a central point of the outer housing. The second coupling part may extend from another portion of the outer peripheral surface of the outer housing by a specific length in a fourth direction that is opposite to the third direction with respect to the central point of the outer housing. The first coupling part may include a pair of the first pillar 431 and the second pillar 433 that are spaced apart from each other to face each other, on opposite sides of the first coupling part. The second coupling part may include a pair of the third pillar 435 and the fourth pillar 437 that are spaced apart from each other to face each other, on opposite sides of the second coupling part. The at least one coupling member may include a first coupling member and a second coupling member. The first coupling member may be coupled to one end of the fixing part and be fitted between and coupled to the first pillar and the second pillar, and the second coupling member may be coupled to an opposite end of the fixing part and be fitted between and coupled to the third pillar and the fourth pillar.

The first pillar may have a first coupling recess 431a on a first side surface of the first pillar and the second pillar may have a second coupling recess on a second side surface of the second pillar. The first side surface and the second side surface may face each other. The third pillar may have a third coupling recess 435a on a third side surface of the third pillar and the fourth pillar may have a fourth coupling recess on a fourth side surface of the fourth pillar. The third side surface and the fourth side surface may face each other. One side of the first coupling member may be inserted into and coupled to the first coupling recess and an opposite side of the first coupling member may be inserted into and coupled to the second coupling recess, and one side of the second coupling member may be inserted into and coupled to the third coupling recess and an opposite side of the second coupling member may be inserted into and coupled to the fourth coupling recess.

At least one of the first coupling recess, the second coupling recess, the third coupling recess, and the fourth coupling recess may extend to a portion of an inner peripheral surface 413 of the outer housing such that at least one through hole (e.g., the first through hole 431b and the third through hole 435b) passes through the outer peripheral surface 411 of the outer housing and the inner peripheral surface of the outer housing, and the communication signal line 490 may be inserted into and disposed in the at least one through hole.

At least one of the first coupling recess, the second coupling recess, the third coupling recess, and the fourth coupling recess may formed with a portion of the inner peripheral surface of the outer housing in a curved form.

At least one of the first coupling recess, the second coupling recess, the third coupling recess, and the fourth coupling recess may be filled with a dielectric material.

At least one of the first pillar, the second pillar, the third pillar, and the fourth pillar may include a recessed portion 631c, and the recessed portion may be formed adjacent to an area in which the coupling member and the communication signal line are in contact with each other.

The recessed portion may be formed to be relatively larger than a depth and a width of the first coupling recess, the second coupling recess, the third coupling recess, or the fourth coupling recess.

The coupling member may include a central portion 210 in which a hollow is formed, an elastic member 220 disposed in the hollow, a first extension 230 coupled with a left periphery of the elastic member, a first periphery 250 extending from a left periphery of the first extension and coupled to any one pillar of the coupling part, a second extension 270) coupled with a right periphery of the elastic member, and a second periphery 290 extending from a right periphery of the second extension and coupled to another pillar of the coupling part.

The central portion may be formed of a conductive material to be used as an antenna radiator or a ground area.

At least one end of the elastic member may be connected with the communication signal line to be used as an antenna radiator.

The elastic member may be implemented with a spring to be used as a helical antenna.

A portion of at least one of the first extension and the second extension may have a diameter that is the same as or similar to a diameter of the hollow, and the portion of the at least one extension may be inserted into an inside of the central portion to support the elastic member so as not to be exposed to an outside of the central portion.

A portion of a side surface of at least one of the first extension and the second extension may protrude outwards.

The coupling member may have a length that is relatively larger than a width of each of opposite ends of the fixing part.

The coupling part may include a pair of a first pillar and a second pillar that extend from a lower surface of the outer housing and are spaced apart from each other to face each other, on opposite sides of the coupling part. The coupling member may be coupled to a front surface of the fixing part and is fitted between and coupled to the first pillar and the second pillar.

The coupling member and the outer housing connected with the coupling member may be used as an antenna.

The electronic device may further include a camera module 970 seated in the outer housing and exposed to an outside through one surface of the outer housing.

An inner space of an electronic device may include an antenna by using a coupling member.

The term "module" as used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. The "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to embodiments of the present disclosure may be implemented as instructions stored in a computer-readable storage medium in the form of a program module. In the case where the instructions are executed by a processor 330, the processor may perform functions corresponding to the instructions. The computer-readable storage medium may be, for example, the memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, and the like). The program instructions may include machine language codes generated by compilers and high-level language codes that may be executed by computers using interpreters. The above-mentioned hardware device may be configured to be operated as one or more software modules for performing operations of certain embodiments of the present disclosure and vice versa.

A module or a program module according to an embodiment of the present disclosure may include at least one of the above-mentioned elements, or some elements may be omitted or other additional elements may be added. Operations performed by the module, the program module or other elements may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments disclosed herein, but should be defined by the appended claims and their equivalents.

What is claimed is:

1. An electronic device, comprising:
   an outer housing including a first surface facing in a first direction, a second surface facing in a second direction opposite to the first direction, and a side surface surrounding at least a portion of a space between the first surface and the second surface, wherein a coupling part is formed at a periphery of the outer housing;
   a fixing part;
   a coupling member disposed such that the fixing part is coupled to and supported by the outer housing;
   a printed circuit board;
   a processor; and
   a communication module,
   wherein the coupling member is coupled to one end of the fixing part and to the coupling part,
   at least one side of the coupling member is connected with the communication module through a communication signal line such that the coupling member operates as an antenna radiator,
   wherein the coupling part includes a first pillar having a first coupling recess that extends to the outer housing forming at least one through hole in the outer housing, and
   wherein the communication signal line extends from inside the outer housing to the first coupling recess of the first pillar through the through hole.

2. The electronic device of claim 1, wherein the outer housing has substantially a cylindrical shape,
   the coupling part includes a first coupling part and a second coupling part,
   the first coupling part extends from a portion of an outer peripheral surface of the outer housing by a specific length in a third direction that is substantially perpendicular to the first direction or the second direction with respect to a central point of the outer housing,
   the second coupling part extends from another portion of the outer peripheral surface of the outer housing by a specific length in a fourth direction that is opposite to the third direction with respect to the central point of the outer housing,
   the first coupling part includes the first pillar and a second pillar that are spaced apart from each other to face each other, on opposite sides of the first coupling part,
   the second coupling part includes a third pillar and a fourth pillar that are spaced apart from each other to face each other, on opposite sides of the second coupling part,
   the coupling member includes a first coupling member and a second coupling member,
   the first coupling member is coupled to one end of the fixing part and is fitted between and coupled to the first pillar and the second pillar, and
   the second coupling member is coupled to an opposite end of the fixing part and is fitted between and coupled to the third pillar and the fourth pillar.

3. The electronic device of claim 2, wherein the first pillar has the first coupling recess on a first side surface and the second pillar has a second coupling recess on a second side surface, wherein the first side surface and the second side surface face each other,
   the third pillar has a third coupling recess on a third side surface and the fourth pillar has a fourth coupling recess on a fourth side surface, wherein the third side surface and the fourth side surface face each other,
   one side of the first coupling member is inserted into and coupled to the first coupling recess and an opposite side of the first coupling member is inserted into and coupled to the second coupling recess, and
   one side of the second coupling member is inserted into and coupled to the third coupling recess and an opposite side of the second coupling member is inserted into and coupled to the fourth coupling recess.

4. The electronic device of claim 2, wherein the coupling member includes:
   a central portion in which a hollow is formed;
   an elastic member disposed in the hollow;
   a first extension coupled with a left periphery of the elastic member;

a first periphery extending from a left periphery of the first extension and coupled to any one of the first pillar, the second pillar, the third pillar or the fourth pillar of the coupling part;

a second extension coupled with a right periphery of the elastic member; and a second periphery extending from a right periphery of the second extension and coupled to another pillar of the coupling part.

5. The electronic device of claim 4, wherein the central portion is formed of a conductive material to be used as the antenna radiator or a ground area.

6. The electronic device of claim 4, wherein at least one end of the elastic member is connected with the communication signal line to be used as the antenna radiator.

7. The electronic device of claim 6, wherein the elastic member is implemented with a spring to be used as a helical antenna.

8. The electronic device of claim 4, wherein a portion of at least one of the first extension and the second extension has a diameter that is the same as or similar to a diameter of the hollow, and the portion of the at least one of the first extension and the second extension is inserted into an inside of the central portion to support the elastic member so as not to be exposed to an outside of the central portion.

9. The electronic device of claim 4, wherein a portion of a side surface of at least one of the first extension and the second extension protrudes outwards.

10. The electronic device of claim 4, wherein the coupling member has a length that is larger than a width of each of opposite ends of the fixing part.

11. The electronic device of claim 1, wherein the first coupling recess is formed such that a portion of the inner peripheral surface of the outer housing is a curved form.

12. The electronic device of claim 1, wherein the first coupling recess is filled with a dielectric material.

13. The electronic device of claim 1, wherein the first pillar includes a recessed portion, and wherein the recessed portion is formed adjacent to an area in which the coupling member and the communication signal line are in contact with each other.

14. The electronic device of claim 13, wherein the recessed portion is formed to be larger than the first coupling recess.

15. The electronic device of claim 1, wherein the coupling part includes a second pillar that extends from a lower surface of the outer housing and spaced apart from the first pillar to face each other, on opposite sides of the coupling part, and wherein the coupling member is coupled to a front surface of the fixing part and is disposed between and coupled to the first pillar and the second pillar.

16. The electronic device of claim 15, wherein the coupling member and the outer housing connected with the coupling member are used as the antenna radiator.

17. The electronic device of claim 1, further comprising:

a camera module disposed in the outer housing and exposed to an outside through one surface of the outer housing.

* * * * *